No. 788,309. PATENTED APR. 25, 1905.
R. W. FERGUSON.
TIRE.
APPLICATION FILED MAY 3, 1904.
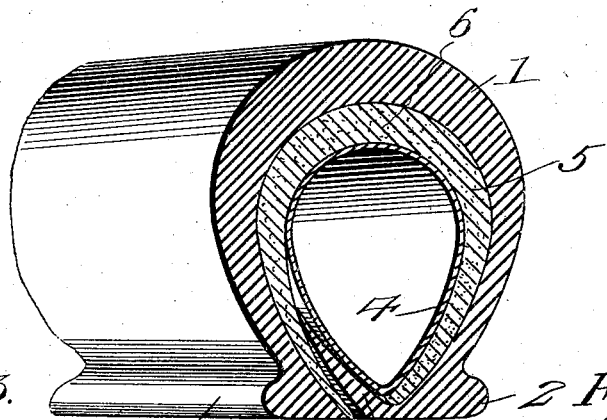
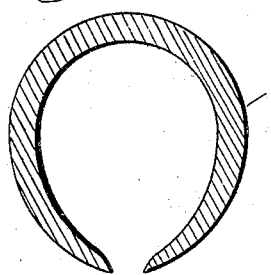 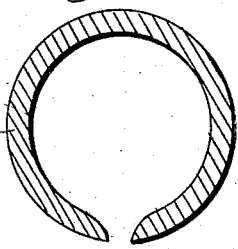
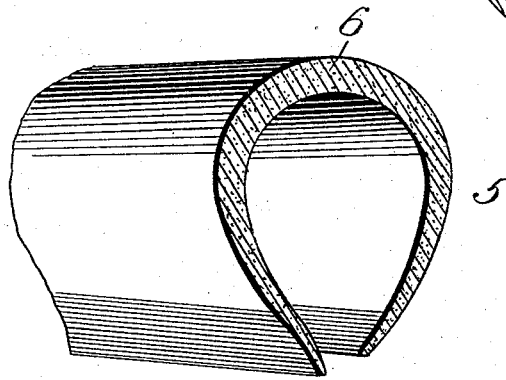
Witnesses
Inventor
R. W. Ferguson,
By Victor J. Evans
Attorney No. 788,309.                                      Patented April 25, 1905.

UNITED STATES PATENT OFFICE.

ROBERT W. FERGUSON, OF WEST ORANGE, NEW JERSEY.

TIRE.

SPECIFICATION forming part of Letters Patent No. 788,309, dated April 25, 1905.

Application filed May 3, 1904. Serial No. 206,223.

*To all whom it may concern:*

Be it known that I, ROBERT W. FERGUSON, a citizen of the United States, residing at West Orange, in the county of Essex and State of New Jersey, have invented new and useful Improvements in Tires, of which the following is a specification.

This invention relates to pneumatic tires especially adapted for use upon the wheels of automobiles, bicycles, and the like, the object of the invention being to provide a novel arrangement of nested shoes and tubes whereby the life and wearing qualities of the tire as a whole are materially increased, the tire strengthened, the inner inflatable tube more effectively guarded from damage by the cutting of the outer shoe, and whereby also an old and nearly-worn-out tire can be bolstered up or reinforced in such manner as to render the same practical and safe for continued use.

With the above general objects in view and with other objects, which will appear as the description proceeds, the invention consists in the novel construction, combination, and arrangement of parts, as hereinafter fully described, illustrated, and claimed.

In the accompanying drawings, Figure 1 is a sectional perspective view of a pneumatic tire embodying the present invention. Fig. 2 is a similar view of the intermediate shoe. Figs. 3 and 4 show slight modifications in the form of the intermediate shoe.

Referring to the drawings, 1 designates the outer shoe or case of a pneumatic tire embodying the outwardly-extending ribs or flanges 2, which are seated in the wheel-rim, (not shown,) and the inner flap 3, which is connected to one edge of the outer shoe and extends within and overlaps the other edge of the shoe.

4 represents the usual inner inflatable tube, which is ordinarily placed directly within the outer shoe 1.

In carrying out the present invention I employ an auxiliary intermediate shoe 5, which is interposed between the outer shoe 1 and the inner tube 4. The said intermediate shoe is substantially the same in shape and material as the outer shoe 1 and is placed directly between the outer shoe and inner tube, one edge of the intermediate shoe being arranged approximately at the junction of the flap 3 with the main body of the outer shoe, while the other edge portion of the intermediate shoe lies between the flap 3 and the other edge portion of the outer shoe 1, as clearly shown in Fig. 1.

Under the arrangement above described when the intermediate shoe is properly placed in position and the tire inflated the said intermediate shoe, or rather a portion thereof, is confined and securely held between the inner flap 3 and the opposite portion of the outer shoe, thus preventing creeping or dislocation of the intermediate shoe. By preference the intermediate shoe is thickest at the tread portion 6 and gradually decreases in thickness therefrom to the opposite edges. The intermediate shoe 5 may be composed of rubber or canvas or a combination of both materials and may be made of any desired degree of thickness, according to the conditions to which it is to be subjected.

By means of the invention above described the life and wearing qualities of the tire are greatly increased, the tire as a whole is strengthened, and even where both the outer and intermediate shoes are badly cut the combination of the two shoes will produce a safe and reliable tire and will thoroughly protect the inner inflatable tire. Should a deep cut or incision be made through both shoes 1 and 5, one of said shoes may be slid lengthwise relatively to the other, so as to move the slits or cuts out of alinement with each other, thus making the tire as a whole again perfectly safe for further use.

Instead of making the shoe of the form shown in Figs. 1 and 2 said shoe may be of equal thickness for a greater portion of its width, as shown in Figs. 3 and 4 at 5ª, and the opposite edge portions thereof may be given a long and gradual taper, as shown in Fig. 3, or an abrupt taper, as shown by the shoe marked 5ᵇ in Fig. 4.

Having thus described the invention, what is claimed as new is—

A tire comprising an outer shoe having an inner flap connected to one edge thereof and overlapping the inner portion of the other edge, an inflatable tube within said outer shoe, and an auxiliary intermedate shoe interposed between the outer shoe and the inner inflatable tube, one edge of the intermediate shoe terminating at the junction of the flap with the outer shoe, and the other edge of the intermediate shoe lying between said flap and the other edge of the outer shoe, substantially as described.

In testimony whereof I affix my signature in presence of two witnesses.

ROBERT W. FERGUSON.

Witnesses:
EDMUND CONDIT,
MICHAEL J. MURPHY.